United States Patent [19]

Jackson

[11] Patent Number: 5,681,096
[45] Date of Patent: Oct. 28, 1997

[54] BRAKE LOCKING MECHANISM

[76] Inventor: Miles Jackson, P.O. Box 67, Monroeville, Ala. 36461-0067

[21] Appl. No.: 476,720

[22] Filed: Jun. 7, 1995

[51] Int. Cl.$^6$ ................................. B60T 8/72; B60T 8/32
[52] U.S. Cl. .................................. 303/61; 303/115.2
[58] Field of Search ........................... 303/119.2, 115.2, 303/61, 113.1, 116.4

[56] References Cited

U.S. PATENT DOCUMENTS

| | | | |
|---|---|---|---|
| 4,691,813 | 9/1987 | Dittner et al. | 303/115.2 |
| 4,715,665 | 12/1987 | Ostwald | 303/115.2 |
| 4,755,007 | 7/1988 | Mollat | 303/61 |

*Primary Examiner*—Matthew C. Graham
*Attorney, Agent, or Firm*—Gregory Friedlander

[57] ABSTRACT

The invention is generally described as a housing having an inlet port for receiving brake fluid and two opposing outlet ports for delivering the fluid to brake cylinders. A fluid screw designed to seal either outlet port is provided on an actuator having a screw mounting and an actuator leg. Between the screw mounting and the actuator leg is a pivot holding the actuator. The movement of the actuator on this pivot is controlled by the movement of the actuator leg which is in turn controlled by the movement of a sliding armature which moves in a channel defined by the housing. The armature movement is, in turn, controlled by two opposing solenoids on either side of the channel. Springs bias the armature back to a central position. The armatures are controlled by a manual switch available to the operator.

11 Claims, 1 Drawing Sheet

BRAKE LOCKING MECHANISM

RELATED ART

U.S. Pat. No. 5,402,824 (Hosoya et al.) teaches of a solenoid valve incorporates a pressure chamber with passage to an outlet port and an electromagnetically-acuatable valve arrangement fitted in the fluid line between the two pressure chambers. The valve arrangement of each solenoid valve is set inside a common monolithic housing.

U.S. Pat. No. 5,375,919 (Furuhashl) discloses an anti-skid control method for an anti-skid control device having two pressure medium lines with an inlet valves, selector valves, and discharge valve arranged in series in each of the two pressure lines. The control circuit opens the inlet valves when the selector valves open to increase the brake pressure of the front wheels.

U.S. Pat. No. 5,299,859 (Tackett et al.) discloses a combination solenoid valve and shuttle valve. See FIGS. 3 and 4.

U.S. Pat. No. 5,209,554 (Dellfuss et al.) discloses a slip-controlled brake system having wheel sensors, electronic circuits capable to control electromagnetically actuable pressure fluid inlet valves and pressure fluid outlet valves provided fluid conduits with pressure pulsation attenuators.

U.S. Pat. No. 4,903,576 (Hoffler et al.) teaches of a solenoid-controlled valve arrangement is provided which includes a relay valve having in Its control line a series arrangement of shut-off valve and a shifting valve. Each of the shut-off valve and shifting valve is solenoid-controlled.

GENERAL DISCUSSION OF THE INVENTION

The invention is directed towards controlling the spin of one of two tires on a vehicle to stop skidding. This is Important where one wheel is not receiving traction and spins freely while the other wheel does not spin. This is present due to the action of the differential of the vehicle or for other reasons.

In order to control this situation, the present invention provides for a method of maintaining brake fluid on one brake line to one wheel (stopping the movement of that wheel) while the other wheel spins freely. In operation, the user applies the brakes, thereby supplying fluid under pressure to both wheels. Next, a switch is thrown by the operator which activates a left or right armature. This armature seals selectively the left or right brake line so that the pressure is maintained on either the left or right brake at the election of the user. The brake may then be released and the selected brake is maintained until the fluid pin is released.

The invention is generally described as a housing having an inlet port for receiving brake fluid and two opposing outlet ports for delivering the fluid to brake cylinders. A fluid screw designed to seal either outlet port is provided on an actuator having a screw mounting and an actuator leg. Between the screw mounting and the actuator leg is a pivot holding the actuator. The movement of the actuator on this pivot is controlled by the movement of the actuator leg which is in turn controlled by the movement of a sliding armature which moves in a channel defined by the housing. The armature movement is, in turn, controlled by two opposing solenoids on either side of the channel. Springs bias the armature back to a central position. The armatures are controlled by a manual switch available to the operator.

The switch activating the armature may be controlled by a timer so that it goes off automatically. In addition, a bleed line may be provided to allow the brake fluid to gradually be removed from the line which is closed by the fluid screw.

The armature may be automatically released when the brake is applied a second time to prevent malfunction of the brakes.

The present invention is designed in order to provide a manually activated switch for correcting and maintaining or directing with a slow bleed for removing hydraulic fluid or brake fluid to a drive shaft.

The preferred embodiment is designed towards allowing this fluid to be directed to a brake fluid activated hydraulic cylinder for the application of brakes to a single wheel or to a single set of wheels of a motor vehicle, preferentially allow one wheel of the vehicle to turn when the vehicle is stuck.

The invention comprises a housing. The housing has a inlet port and two outlet ports. The inlet port is attached to the source of brake fluid.

Each of the two outlet ports goes to a hydraulic cylinder powered by the brake fluid from the inlet port.

A pivoting plug defining air screws on either side is utilized to selectively to plug either the left or right outlet line.

In the preferred embodiment a single, double sided fluid or air screw is mounted between a pivot and a control arm. The control arm in turn is attached to a electromagnetic rod which need not be magnetized.

The metallic rod resides in a shaft defined by the housing.

On the left side of the shaft is the left solenoid on the right side of the shaft is the right solenoid.

The two solenoids are powered alternatively and in opposite directions so that one solenoid cannot work against the other solenoid.

When in use a switch direct power to either the left solenoid or the right solenoid. This pulls the metallic electromagnetic rod into the chamber defined by the powered solenoid. Since the control arm is pivotally attached to the metallic rod it is also pulled driving the air screw in the opposite direction plugging the outlet with pointed end of the air screw.

This maintains the fluid pressure on the line which is blocked maintaining the brake on that fluid.

A bleed hole may be provided in order to allow gradual drain of the fluid so that wheel may be able to turn gradually as the fluid pressure is released.

This bleed line may be controllable so that either it is on or off and so that it allows the bleed of hydraulic fluid at different rates of speed.

Since the other hydraulic line is left free, when the hydraulic pressure is removed from the inlet line it drains immediately allowing the brake by that line to be released.

It is therefore a object of the invention to provide a manually controlled mechanism for maintaining brake fluid on a cylinder of a tire.

It is a additional object of the invention to provide a brake control mechanism selectively for one wheel which gradually releases pressure on the wheel.

It is further object of the invention to provide a mechanism to assist in free stuck vehicles.

These and other objects and advantages of the invention will become better understood hereinafter from a consideration of the specification with reference to the accompanying drawings forming part thereof, and in which like numerals correspond to parts throughout the several views of the invention.

BRIEF DESCRIPTION OF THE DRAWINGS

For a further understanding of the nature and objects of the present invention, reference should be made to the following detailed description taken in conjunction with the accompanying drawings in which like parts are given like reference numerals and wherein.

DETAILED DISCUSSION OF THE PREFERRED EMBODIMENT(S)

Figure 1:
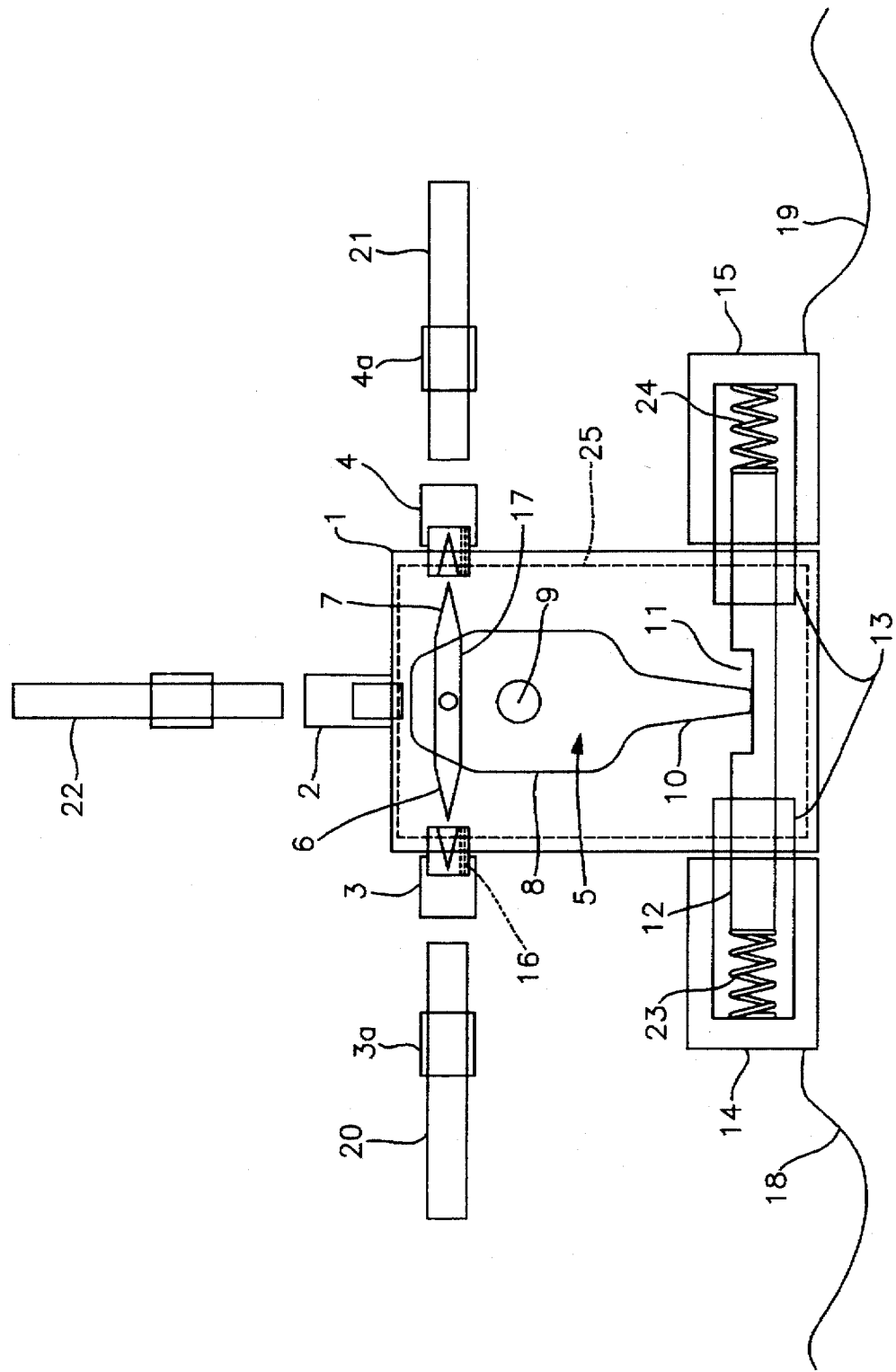
FIG. 1 is a plan view the invention.

The present invention is designed in order to provide a manually activated switch for correcting and maintaining or directing with a slow bleed for removing hydraulic fluid or brake fluid to a drive shaft.

The preferred embodiment is designed towards allowing this fluid to be directed to a brake fluid activated hydraulic cylinder for the application of brakes to a single wheel or to a single set of wheels of a motor vehicle, preferentially allow one wheel of the vehicle to turn when the vehicle is stuck.

The device is designed to fit in place of an existing "T" fitting. Hence, it has several features directed towards maintaining its small size.

The invention comprises a housing 1 which defines an internal chamber 25 for receiving brake fluid or other hydraulic fluid. The housing 1 has a inlet port 2 and two outlet ports, a left port 3 and right port 4. The inlet port 2 is attached to the source of brake fluid, inlet line 22.

Each of the two outlet ports 3 and 4 communicates with a hydraulic cylinder (not shown) powered by the brake fluid from the inlet port 2 by way of a left outlet line 20 and a right outlet line 21.

A pivoting plug 6 is described comprising a fluid screw 17 which has a cone shaped plug on a left side 6 and a right side 7 to selectively respectively plug either the left outlet line 3 or right outlet line 4.

In the preferred embodiment the double sided fluid screw 17 is mounted on the top end of an actuator 8. Also, in the preferred embodiment, the double sided fluid screw 17 is mounted in a lower chamber of the housing 1 below the actuator 8 and is allowed to pivot in its attachment to actuator 8 so that it may adjust slightly to adequately plug the outlet line 6 or 7. The housing 1 may define a chamber in which this fluid screw 17 travels in order to further control the fluid screw 17 movement in response to the pivoting of the actuator 8.

The actuator 1a attached to a pivot 9 is between the screw 17 and an actuator leg 10. The actuator leg 10 in turn fits within a groove 11 defined by an electromagnetic rod or sliding armature 12.

The armature 12 resides in an armature channel 13 defined by the housing 1.

On the left side 12 of the channel 13 is the left solenoid 14 on the right side of the channel is the right solenoid 15. Left springs 23 and right spring 24 gives the armature 12 to the center of the channel 13.

The two solenoids 14 and 15 are powered alternatively and in opposite directions so that one solenoid does work against the other solenoid.

When in use a switch (not shown) directs power from the electrical source of the engine to either the left solenoid 14 or the right solenoid 15 by way of right wire 18 or left wire 19. The housing is grounded to the body of the car so no return wire is necessary. This pulls the magnetized armature 12 into the side of the chamber 13 closest to the powered solenoid. Since the control arm 10 is attached by way of the groove 11 of the metallic rod 12, the armature 8 pivots about pivot 9 driving the fluid screw 17 in the opposite direction plugging the outlet with pointed end of the fluid screw 5.

This maintains the fluid pressure on the line which is blocked maintaining the brake on that side. The brake fluid may them be released allowing the opposite wheel to spin freely as the brake fluid drains from the unplugged outlet line. A mechanism may be provided to release the switch powering the solenoids 14 and 15 when on or more of the wheels turn above a certain speed, such as 5 miles and hour to prevent accidents. This may be accomplished by breaking the electrical circuit when the non-driving wheel exceeds a certain number of revolutions per minute.

A bleed hole 16 may be provided in order to allow gradual drain of the fluid so that wheel may be able to turn gradually as the fluid pressure is released. This bleed hole 16 may be in the threads of the left port 3 and right port 4. Alternatively, it may be in the bolt fittings 3a and 4a which attach to the left port 3 and right port 4 respectively. In either embodiment, the size of the hole 16 may be varied using different fittings. A bleed line 16 running between both fittings 3 & 3a and 4 & 4a may allow for adjustment by adjusting the position of the bolt fittings 3a and 4a relative to the left port 3 and right port 4 respectively.

This bleed line 16 may be controlled so that either it is on or off and so that it allows the bleed of hydraulic fluid at different rates of speed by controlling the size of the opening from the housing 1 to the bleed line 16.

Since the other hydraulic line is left free, when the hydraulic pressure is removed from the inlet line (as by releasing the brakes) it drains immediately allowing the brake controlled by that line to be released.

Because many modifications may be made in the embodiments herein detailed in accordance with the descriptive requirements of the law, it is to be understood that the details herein are to be interpreted as illustrative and not in a limiting sense.

I claim:

1. A device to maintain hydraulic or brake fluid on a cylinder comprising:

(a) a source of hydraulic fluid under pressure;

(b) a housing defining a fluid chamber having an inlet port connected to the source of hydraulic fluid under pressure said housing and defining an outlet port;

(c) at least one outlet line connected to said housing outlet port receiving fluid from said outlet port;

(d) a fluid screw pivotally mounted on said housing so that when said screw moves within the housing it may enter the at least one outlet port and cooperate with said opening to substantially seal the outlet port;

(e) a solenoid means for biasing the movement of the fluid screw where the fluid screw pivotally mounted on said housing further comprises:

(f) an armature channel defined by said housing, (g) a pivot attached to said housing approximately perpendicular to said at least one channel;

(h) an actuator leg having a top end a bottom end connected to the pivot;

(i) and wherein said fluid screw is mounted on said actuator top end so that as the actuator leg pivots the fluid screw moves within the at least one outlet port and cooperates with said port to seal said outlet port; and further comprising (j) A sliding armature having at least one end passing through said armature channel having a middle contacting the bottom end of the actuator leg so that the actuator leg moves with the movement of the armature;

(k) and wherein said solenoid means provides directional biasing to move the sliding armature which in turn moves the fluid screw.

2. The device of claim 1 further comprising:

(l) a blasing means of rreeleasbly maintaining the position of the sliding armature.

3. The device of claim 1 wherein the solenoid means comprises a power source for providing electrical current and at least one solenoid electrically powered by said power source said solenoid connected to said armature channel so as to exert an electromagnetic field acting on said sliding armature.

4. The device of claim 1 wherein the device further comprises an outlet line connected to the at least one outlet port and further comprising a bleed means of allowing the at least one outlet line to drain hydraulic fluid to the housing fluid chamber.

5. The device of claim 4 wherein the bleed means further comprises a bleed channel defined by the outlet port said bleed channel providing an opening between the outlet line and the fluid chamber.

6. The device of claim 5 wherein the outlet line further comprises a connecting nut connecting the outlet line to the outlet port and wherein the size of the bleed channel opening is controlled by the position of the connecting nut over the bleed channel defined by the outlet port.

7. The device of claim 4 wherein the outlet line further comprises a connecting nut connecting the outlet line to the outlet port and wherein the bleed means further comprises a bleed channel defined by the connecting nut providing communication between the outlet line and the outlet port.

8. A device to maintain hydraulic or brake fluid on a cylinder comprising:

(a) a source of hydraulic fluid under pressure;

(b) a housing defining a fluid chamber having an inlet port connected to the source of hydraulic fluid under pressure said housing and defining an outlet port;

(c) at least one outlet line connected to said housing outlet port receiving fluid from said outlet port;

(d) a fluid screw pivotally mounted on said housing so that when said screw moves within the housing it may enter the at least one outlet port and cooperate with said opening to substantially seal the outlet port;

(e) a solenoid means for biasing the movement of the fluid screw further comprising:

(f) a biasing means for releasably maintaining the position of the fluid screw out of contact with said outlet port and wherein the at least one outlet line further comprises a first and a second outlet line and wherein the fluid screw further comprises a first plug and a second plug and wherein the fluid screw pivots within the housing so that the first plug cooperates with the first outlet port to substantially seal the first outlet port and wherein the fluid screw pivots within the housing so that the second plug cooperates with the second outlet port to substantially seal the second outlet port and wherein the fluid screw pivotally mounted on said housing further comprises:

(g) an armature channel defined by said housing, (h) a pivot attached to said housing approximately perpendicular to said armature channel;

(i) an actuator leg having a top end a bottom end connected to the pivot;

(j) and wherein said fluid screw is mounted on said actuator top end so that as the actuator leg bottom pivots to the right the fluid screw moves to the left plugging the first outlet port and wherein the fluid screw moves to the right plugging the second outlet port when the actuator bottom leg pivots to the left;

(k) a sliding armature having at least one end passing through said armature channel, said armature having a middle contacting the bottom leg of the actuator so that the actuator moves with the movement of the armature middle;

(l) and wherein said solenoid means provides directional biasing to move the sliding armature in response to the solenoid means which in turn moves the fluid screw.

9. The device of claim 8 further comprising:

(l) a blasing means for releasably maintaining the position of the sliding armature.

10. The device of claim 9 wherein the blasing means further comprises at least one spring located within the armature channel and wherein the armature channel defines a middle and contacting the housing and the sliding armature so that the extension of the spring tends to hold the armature in the middle of the channel.

11. The device of claim 9 wherein the blasing means further comprises a left end of said armature channel, a right end of said armature housing and a center of said armature housing and wherein the blasing means further comprises a first spring between the armature and the left end of the armature channel, a second spring between the right end of the armature channel and the armature so that the two springs blas the armature to the center of the armature channel.

* * * * *